July 4, 1950 W. N. LITTLE, SR 2,513,730
GRASS TRIMMER
Filed Feb. 9, 1948
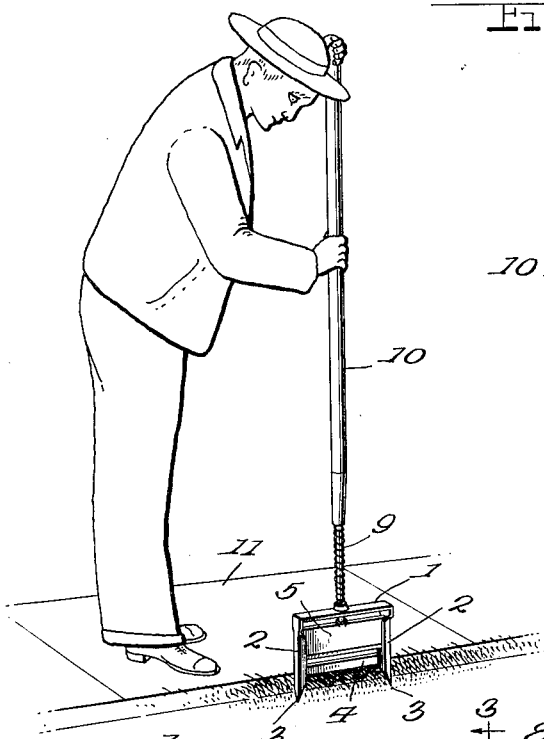
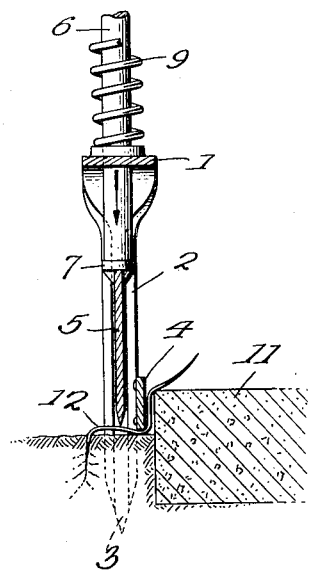
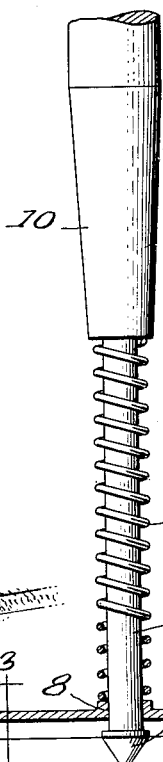
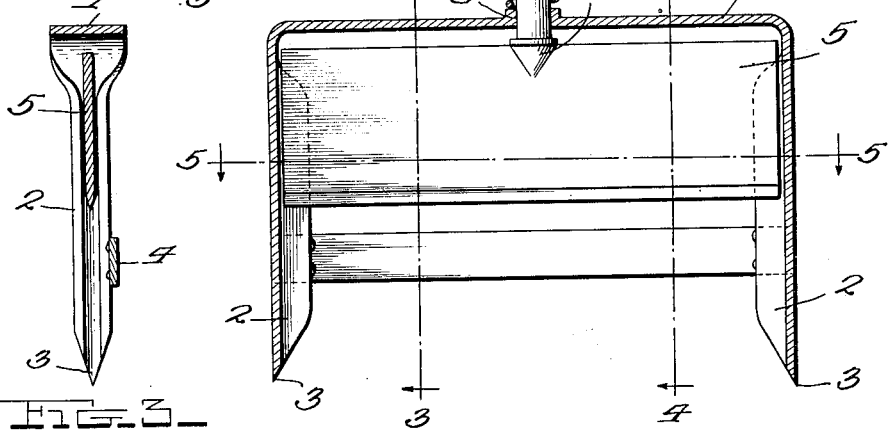
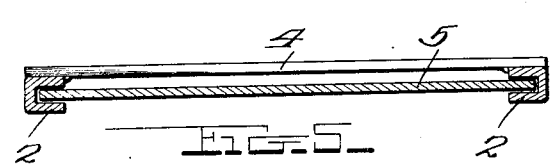
INVENTOR.
William N. Little, Sr.
BY
Baldwin, Wight & Prevost
attys.

Patented July 4, 1950

2,513,730

UNITED STATES PATENT OFFICE 2,513,730

GRASS TRIMMER

William N. Little, Sr., Mobile, Ala.

Application February 9, 1948, Serial No. 7,229

3 Claims. (Cl. 30—289)

1

My invention consists in new and useful improvements in a grass trimmer and has for its object to provide a device of this character which is extremely simple in construction and easy to operate from a standing position.

Another object of my invention is to provide a grass trimmer which is composed of a minimum of parts and is so designed as to greatly simplify its manufacture and assembly, thus enabling its production in quantities, at a cost within the means of the average user.

Another object of the invention is to provide a grass trimmer which, in spite of its simplicity, is of rigid construction which will not become loose and wobbly after prolonged operation.

A still further object of the invention is to provide a grass trimmer which is readily adaptable for use in practically any position and can be employed for trimming along a sidewalk, a perpendicular wall, or a raised edge such as a curbing along a driveway.

With the above and other objects in view which will appear as the description proceeds, my invention consists in the novel features herein set forth, illustrated in the accompanying drawings and more particularly pointed out in the appended claims.

Referring to the drawings in which numerals of like character designate similar parts throughout the several views:

Figure 1 is a perspective view showing my improved grass trimmer in use;

Figure 2 is an enlarged view, partly in section, showing the construction of the yoke of my improved trimmer;

Figure 3 is a transverse sectional view taken on line 3—3 of Figure 2 with the cutting blade in retracted position;

Figure 4 is a sectional view taken on line 4—4 of Figure 2, showing the cutting blade in cutting position; and Figure 5 is a horizontal sectional view taken on line 5—5 of Figure 2 showing the guide means for the cutting blade.

In the drawings, 1 represents the frame or yoke of my improved trimmer which consists of a substantially U-shaped member preferably formed of a flat strip of suitable metal, the vertical legs of the yoke being bent inwardly along each of their edges and crimped as at 2 to form oppositely disposed guide slots for the cutting blade. The lower ends of the vertical legs are sharpened as at 3 to faciiltate their insertion into the sod, as will hereinafter appear. In order to reinforce the vertical legs of the yoke 1 and prevent their

2 spreading apart in operation, I provide a cross member or bar 4 which is preferably welded to the turned-in edges 2 of the yoke legs, at a point located a predetermined distance above the pointed ends 3. This cross bar also serves as a means for holding the grass down for the cutting operation.

The blade 5 which is preferably sharpened along its lower edge, is mounted for vertical reciprocation within the slots formed in the legs of the yoke 1. A stem 6, secured preferably by welding as at 7, to the upper edge of the blade 5, extends through a suitable opening 8 centrally disposed in the cross member of the yoke 1, a coil spring 9 being interposed between the yoke 1 and the handle 10 mounted at the upper end of the stem 6. This spring 9 normally urges the handle 10 and stem 6 upwardly with respect to the yoke 1, thereby causing the blade 5 attached to the stem 6, to normally assume the retracted position shown in Figure 2, in the upper portion of the yoke.

In operation, the trimmer is grasped in the hands of the operator, by the handle 10 and the sharpened ends 3 on the legs of the yoke 1 are inserted into the sod adjacent the edge of a curbing or the like 11. As yoke is forced into the ground the cross bar 4 depresses the blades of grass as shown in Figure 4, and holds them down along the edge to be cut. By depressing the handle 10, the blade 5 is forced downwardly, cutting the grass in close proximity to the curbing 11. By a repetition of this operation along the curbing or edge to be cut, the grass may be trimmed along a uniform line with ease.

It will be apparent that this structure is very simple, both in manufacture and operation and consists of a minimum of working parts, thus eliminating the necessity of repairs and replacements caused by wear.

The yoke 1 may be formed by stamping and bending a single strip of flat metal; thus, eliminating the necessity of difficult machining and assembling operations, yet the final result is a strong and accurately performing yoke which firmly supports the reciprocating blade.

From the foregoing, it is believed that my invention may be readily understood by those skilled in the art without further description, it being borne in mind that numerous changes may be made in the details of construction without departing from the spirit of the invention as set forth in the following claims.

I claim:

1. A grass trimmer, comprising a yoke having a pair of spaced, ground-engaging guide members, a cutting blade mounted for vertical reciprocation between said guide members, a handle extending through said yoke and fixed to said blade, resilient means normally retaining said blade in retracted position, and a grass engaging cross bar extending between and fixed to said guide members at a point below the retracted position of the cutting edge of said blade.

2. A grass trimmer, comprising a yoke having a pair of spaced, ground-engaging guide members, sharpened at their ground-engaging ends, a cutting blade mounted for vertical reciprocation between said guide members, a handle extending through said yoke and fixed to said blade, resilient means normally retaining said blade in retracted position and a grass engaging cross bar extending between and fixed to said guide members at a point between the retracted position of the cutting edge of said blade and the sharpened ends of said guide members.

3. A grass trimmer, comprising a substantially U-shaped yoke, the vertical legs of which are sharpened at their lower ends and form ground-engaging members, the edges of said legs being channel shaped to form oppositely disposed guide members, a cutting blade mounted for vertical reciprocation between said guide members, a handle extending through said yoke and fixed to said blade, resilient means normally retaining said blade in retracted position and a grass engaging cross bar extending across and fixed to one side of said guide members and located a predetermined distance above the sharpened ends of said legs and below the retracted position of said cutting blade.

WILLIAM N. LITTLE, Sr.

REFERENCES CITED

The following references are of record in the file of this patent:

UNITED STATES PATENTS

| Number | Name | Date |
|---|---|---|
| 390,759 | Lamarre | Oct. 9, 1888 |
| 1,474,711 | Haas | Nov. 20, 1923 |
| 1,667,012 | Pieper | Apr. 24, 1928 |
| 1,857,383 | Johnson | May 10, 1932 |